United States Patent
Oh (12) United States Patent (10) Patent No.: US 12,463,198 B2
(45) Date of Patent: Nov. 4, 2025

(54) NEGATIVE ELECTRODE ACTIVE MATERIAL FOR NON-AQUEOUS ELECTROLYTE SECONDARY BATTERY AND MANUFACTURING METHOD THEREOF

(71) Applicant: DAEJOO ELECTRONIC MATERIALS CO., LTD, Siheung-Si (KR)

(72) Inventor: Seung Min Oh, Siheung-Si (KR)

(73) Assignee: DAEJOO ELECTRONIC MATERIALS CO., LTD., Siheung-si (KR)

( * ) Notice: Subject to any disclaimer, the term of this patent is extended or adjusted under 35 U.S.C. 154(b) by 354 days.

(21) Appl. No.: 16/769,320

(22) PCT Filed: Dec. 5, 2018

(86) PCT No.: PCT/KR2018/015351
§ 371 (c)(1),
(2) Date: Jun. 3, 2020

(87) PCT Pub. No.: WO2019/112325
PCT Pub. Date: Jun. 13, 2019

(65) Prior Publication Data
US 2020/0295352 A1    Sep. 17, 2020

(30) Foreign Application Priority Data

Dec. 5, 2017 (KR) .................. 10-2017-0166044
Dec. 5, 2018 (KR) .................. 10-2018-0155595

(51) Int. Cl.
*H01M 4/134* (2010.01)
*H01M 4/04* (2006.01)
(Continued)

(52) U.S. Cl.
CPC ......... *H01M 4/134* (2013.01); *H01M 4/0471* (2013.01); *H01M 4/131* (2013.01);
(Continued)

(58) Field of Classification Search
CPC .... H01M 4/134; H01M 4/0471; H01M 4/131; H01M 4/364; H01M 4/386; H01M 4/587;
(Continued)

(56) References Cited

U.S. PATENT DOCUMENTS 11,791,462 B2 * 10/2023 Zhao .................. H01M 4/0428
429/218.1
2005/0186475 A1   8/2005 Jeong et al.
(Continued)

FOREIGN PATENT DOCUMENTS

CN          105118971 A      12/2015
CN          105264698 A  *   1/2016  ........... C01B 33/113
(Continued)

OTHER PUBLICATIONS

Machine translation of CN-106356508-A; filing date Sep. 29, 2016 (Year: 2020).*

*Primary Examiner* — Mark Ruthkosky
(74) *Attorney, Agent, or Firm* — Sughrue Mion, PLLC (57) ABSTRACT

The present disclosure relates to a negative electrode active material for non-aqueous electrolyte secondary battery and a manufacturing method thereof and, more specifically to, a negative electrode active material for non-aqueous electrolyte secondary battery, the negative electrode active material which not only improves conductivity by reacting, silicon, silicon dioxide and magnesium through a gas phase reaction to produce a reaction product and coating carbon on the surface of the reaction product so as to give conductivity to the reaction product, but also exhibits an effect of greatly improving lifetime characteristics and capacity characteris-
(Continued)

tics by showing a structure that is stable in a volume change caused by intercalation or deintercalation of lithium, and a manufacturing method thereof.

15 Claims, 3 Drawing Sheets

(51) Int. Cl.
*H01M 4/131* (2010.01)
*H01M 4/36* (2006.01)
*H01M 4/38* (2006.01)
*H01M 4/587* (2010.01)
*H01M 10/0525* (2010.01)
*H01M 4/02* (2006.01)

(52) U.S. Cl.
CPC .......... *H01M 4/364* (2013.01); *H01M 4/386* (2013.01); *H01M 4/587* (2013.01); *H01M 10/0525* (2013.01); *C01P 2002/74* (2013.01); *H01M 2004/021* (2013.01); *H01M 2004/027* (2013.01)

(58) Field of Classification Search
CPC ....... H01M 10/0525; H01M 2004/021; H01M 2004/027; C01P 2002/74
See application file for complete search history.

(56) References Cited

U.S. PATENT DOCUMENTS

| | | | |
|---|---|---|---|
| 2009/0239151 A1* | 9/2009 | Nakanishi | H01M 4/1395 427/78 |
| 2015/0380733 A1 | 12/2015 | Lee et al. | |
| 2016/0218357 A1* | 7/2016 | Yoshikawa | H01M 4/382 |
| 2018/0090750 A1* | 3/2018 | Oh | H01M 4/625 |

FOREIGN PATENT DOCUMENTS

| | | | | |
|---|---|---|---|---|
| CN | 106356508 A | | 1/2017 | |
| CN | 106356508 B | | 1/2017 | |
| CN | 111785948 A | * | 10/2020 | ............ H01M 4/366 |
| JP | 2004047404 A | * | 2/2004 | ............ B82Y 30/00 |
| JP | 2005243640 B2 | | 8/2005 | |
| JP | 2005-243640 A | | 9/2005 | |
| JP | 2010170943 B2 | | 5/2010 | |
| JP | 2010-170943 A | | 8/2010 | |
| JP | 2012033317 A | * | 2/2012 | |
| JP | 2015230792 A | | 12/2015 | |
| JP | 2016-504722 A | | 2/2016 | |
| JP | 2016504722 B2 | | 12/2016 | |
| JP | 2017073302 A | | 4/2017 | |
| JP | 6173969 B2 | * | 8/2017 | |
| KR | 101884209 B1 | | 8/2018 | |
| WO | 2015145521 A1 | | 10/2015 | |
| WO | 2016/204336 A1 | | 12/2016 | |
| WO | WO-2020256395 A2 | * | 12/2020 | ............ H01M 4/386 |

* cited by examiner

NEGATIVE ELECTRODE ACTIVE MATERIAL FOR NON-AQUEOUS ELECTROLYTE SECONDARY BATTERY AND MANUFACTURING METHOD THEREOF

BACKGROUND OF THE DISCLOSURE

Field of the Disclosure

The present disclosure relates to a negative electrode active material for non-aqueous electrolyte secondary battery and a manufacturing method thereof and, more specifically to, a negative electrode active material for non-aqueous electrolyte secondary battery, the negative electrode active material which not only improves conductivity by reacting silicon and silicon dioxide with magnesium through a gas phase reaction to prepare a silicon oxide composite and coating carbon on the surface of the silicon oxide composite, but also exhibits an effect of greatly improving lifetime characteristics and capacity efficiency characteristics by showing a structure that is stable in a volume change caused by intercalation or deintercalation of lithium, and a manufacturing method thereof.

Related Art

A lithium secondary battery which has recently been spotlighted as a power source for portable small electronic devices and electric cars is a high energy density battery which exhibits a discharge voltage more than twice as high as an existing battery using an aqueous alkaline solution by using an organic electrolyte.

Oxides formed of transition metals having a structure of enabling intercalation of lithium, such as $LiCoO_2$, $LiMn_2O_4$, $LiNi_{1-x}Co_xO_2$ (0<x<1), and the like have mainly been used as a positive electrode active material for lithium secondary batteries, and carbon-based materials in various forms including artificial graphite, natural graphite and hard carbon which enable intercalation and deintercalation of lithium have been applied as a negative electrode active material for the lithium secondary batteries.

Although graphite has mainly been used as a negative electrode material for lithium secondary batteries, graphite has a small capacity per unit mass of 372 mAh/g, and it is difficult to manufacture lithium secondary batteries having high capacities by using graphite.

A metal material such as Si, Sn, Al, Sb or the like has been examined as a new material which is capable of replacing a carbon-based negative electrode active material. It has been known that a charging or discharging process is performed in such a metal material by an alloying or non-alloying reaction with Li, and the metal material exhibits a high capacity compared to graphite, i.e., a commercial negative electrode active material (Patent document 1).

However, metal such as Si, Sn, Al, Sb or the like causes large volume expansion or contraction in the process of performing an alloying or non-alloying reaction with Li, and has a problem of deteriorating lifetime characteristics due to micronization, loss of conduction path, and the like accordingly. Particularly, although Si has been known to be the most appropriate material as a high capacity negative electrode material in aspects of discharge capacity (4,200 mAh/g) and discharge voltage (0.4 V), a rapid drop in lifetime characteristics has been shown as degeneration of the active material is generated by expansion of a large volume reaching about 400% caused when Li ions are intercalated (charged) into the active material.

Silicon oxide ($SiO_x$) has been spotlighted as material which has several times higher capacity (about 1500 mAh/g) than capacity (about 350 mAh/g) of a carbon-based anode having a small capacity compared to silicon, and of which volumetric expansion ratio and lifetime (capacity retention rate) characteristics are greatly improved compared to other silicon-based material in a structure comprising a silicon nanocrystal uniformly dispersed in a silicon dioxide matrix.

However, such a silicon oxide having excellent capacity and lifetime characteristics produces lithium oxides such as lithium oxide ($Li_2O$), lithium silicate and the like by reacting lithium with silicon oxide during initial charging, and the produced lithium oxides are not reversibly returned to a positive electrode during discharging.

A conventional method has been suggested, the method of improving initial charging/discharging efficiency through a silicon-silicon oxide composite by a method of heating the mixture of $SiO_x$ with magnesium compound in order to improve stability during manufacturing of such an electrode. Further, a method of preparing a silicon-silicon oxide composite containing magnesium or calcium by reacting $SiO_x$ powders with magnesium hydride ($MgH_2$) or calcium hydride ($CaH_2$) has been reported (Patent document 2). It has been shown in the method that capacity retention rate is deteriorated compared to $SiO_x$ since size of silicon crystal is rapidly grown, and Mg or Ca is nonuniformly distributed by a local exothermic reaction although mixing of oxygen is decreased during the process of reacting the $SiO_x$ powders with $MgH_2$ or $CaH_2$.

As results of performing a careful review on a structure which is stable in a volume change caused by intercalation or deintercalation of lithium as well as conductivity of the surface so as to solve such problems of conventional techniques, the present disclosure has found that a negative electrode active material for non-aqueous electrolyte secondary battery according to the present disclosure solves the problems, stably has large charging and discharging capacities, and can greatly improve charging and discharging cycle characteristics and efficiencies by dispersing silicon microcrystal or particulates in silicon dioxide through a gas phase reaction and coating carbon on the negative electrode active material to give conductivity to at least a portion of the surface of the negative electrode active material.

Prior art includes Korean Patent Laid-open Publication No. 10-2014-0042146 (Publication date: Apr. 7, 2014) as Patent document 1 and Japanese Patent Laid-open Publication No. 2012-033317 (Publication date: Feb. 16, 2012) as Patent document 2.

SUMMARY OF THE DISCLOSURE

In order to solve the above-mentioned problems of a conventional negative electrode active material for secondary battery, an objective of the present disclosure is to provide a negative electrode active material for non-aqueous electrolyte secondary battery, the negative electrode active material of which charging and discharging capacities, initial charging and discharging efficiencies, and capacity retention rate are improved.

Another objective of the present disclosure is to provide a manufacturing method for manufacturing a negative electrode active material for non-aqueous electrolyte secondary battery comprising a silicon oxide composite.

Another objective of the present disclosure is to provide a negative electrode and a non-aqueous electrolyte secondary battery which comprise the negative electrode active material for non-aqueous electrolyte secondary battery comprising the silicon oxide composite.

In order to solve the above-mentioned problems of conventional techniques, the present disclosure provides a negative electrode active material for non-aqueous electrolyte secondary battery, the negative electrode active material comprising a silicon oxide composite comprising silicon, a silicon oxide ($SiO_x$, $0<x\leq2$) and a magnesium silicate, wherein the magnesium silicate includes $MgSiO_3$, and the negative electrode active material has a ratio of a diffraction peak intensity $I_{MgSiO3(610)}$ detected at $2\theta=30°$ to $32°$ by $MgSiO_3$ to a diffraction peak intensity $I_{si(111)}$ detected at $2\theta=27.5°$ to $29.5°$ by Si(111) during X-ray diffraction analysis, i.e., $0.1<I_{MgSiO3(610)}/I_{si(111)}<0.5$. In a negative electrode active material comprising a silicon oxide composite according to the present disclosure, a preferable ratio of $I_{MgSiO3(610)}$ to $I_{si(111)}$ may be $0.15<I_{MgSiO3(610)}/I_{si(111)}<0.3$.

A silicon oxide composite according to the present disclosure comprises a certain portion or more of a $MgSiO_3$ type magnesium silicate phase. In a silicon oxide composite according to the present disclosure, silicon particulates of the silicon oxide composite may be homogeneously dispersed in a matrix comprising silicon oxide and crystalline $MgSiO_3$. Since it is difficult for $MgSiO_3$ to react with Li ions, the $MgSiO_3$ can improve cycle characteristics, and initial charging and discharging efficiencies by decreasing expansion amount of the electrode when intercalating the Li ions in case of using the $MgSiO_3$ as an electrode.

A silicon oxide composite according to the present disclosure satisfies the above-mentioned range of $I_{MgSiO3(610)}/I_{si(111)}$ of 0.1 to 0.5 such that deterioration of battery characteristics can be inhibited, and formation, intercalation and deintercalation of a stable Li compound can be easily performed by existence of a magnesium silicate salt. Moreover, a silicon oxide composite according to the present disclosure can further improve initial efficiency.

It is not desirable that the $I_{MgSiO3(610)}/I_{si(111)}$ exceeds 0.5 in a silicon oxide composite according to the present disclosure since initial charging and discharging capacities are lowered according as a $MgSiO_3$ type crystal is formed in an excessive amount. If the $I_{MgSiO3(610)}/I_{si(111)}$ is less than 0.1, a $MgSiO_3$ type magnesium silicate phase is formed in a small amount, and an effect of improving cycle characteristics during a charging and discharging test is decreased accordingly. The reason for decreasing initial charging and discharging capacities may be because an Si atom which is contained in $SiO_x$ and alloyed with an original Li atom is reacted with an Mg atom added such that a $MgSiO_3$ type crystal which is hard to be reacted with the Li atom is formed in an excessive amount.

A silicon oxide composite according to the present disclosure allows a diffraction peak by Si(111) to be shown at $2\theta=27.5°$ to $29.5°$ during X-ray diffraction analysis, and has a silicon crystallite size of 2 to 100 nm calculated from Full Width at Half Maximum (FWHM) of the diffraction peak.

A silicon oxide composite according to the present disclosure preferably has 2 to 100 nm, more preferably 2 to 50 nm, and further more preferably 2 to 30 nm of a microcrystal particle diameter of silicon particles obtained by Scherrer's equation based on diffusion of a diffracted ray reverting to Si(111) centering around the vicinity of $2\theta=27.5°$ to $29.5°$ at an X-ray diffraction (Cu—K$\alpha$).

In a negative electrode active material for non-aqueous electrolyte secondary battery according to the present disclosure, the silicon oxide composite comprises 2 to 30 parts by weight of magnesium based on 100 parts by weight of the total silicon oxide composite weight.

In a negative electrode active material for non-aqueous electrolyte secondary battery according to the present disclosure, the magnesium silicate further comprises $Mg_2SiO_4$. The magnesium silicate may be desirable since the magnesium silicate is an oxide of which Gibbs free energy thermodynamically has a negative value compared to the silicon oxide, and the magnesium silicate plays a role of inhibiting occurrence of an initial irreversible reaction by stably controlling lithium in an amorphous phase.

In a negative electrode active material for non-aqueous electrolyte secondary battery according to the present disclosure, the magnesium silicate denotes a compound represented by general formula $Mg_xSiO_y$ ($0.5\leq x\leq2$, $2.5\leq y\leq4$). In a negative electrode active material for non-aqueous electrolyte secondary battery according to the present disclosure, it is preferable that the magnesium silicate comprises an $MgSiO_3$ (enstatite) crystal as a main component. It is preferable that, when performing the process of analyzing X-ray diffraction patterns on the $MgSiO_3$ (enstatite) crystal, a peak reverting to a silicon crystal is shown within a diffraction angle range of $28°<2\theta<29°$, and a peak reverting to the $MgSiO_3$ crystal is shown within a diffraction angle range of $30.5°<2\theta<31.5°$. Further, it is preferable that the magnesium silicate comprises an $Mg_2SiO_4$ (forsterite) crystal.

In a negative electrode active material for non-aqueous electrolyte secondary battery according to the present disclosure, the silicon oxide composite has a ratio (Si/O) of the number of silicon atoms to that of oxygen atoms of 0.5 to 2.

In a negative electrode active material for non-aqueous electrolyte secondary battery according to the present disclosure, the silicon oxide composite further comprises a carbon-containing coating layer on the surface thereof. In a negative electrode active material for non-aqueous electrolyte secondary battery according to the present disclosure, the silicon oxide composite comprises 2 to 20 parts by weight of the carbon-containing coating layer per 100 parts by weight of the total silicon oxide composite weight. In a negative electrode active material for non-aqueous electrolyte secondary battery according to the present disclosure, a sufficient conductivity improving effect cannot be obtained if the coating amount of the carbon-containing coating layer is 2 parts by mass or less, and a conductivity improving effect due to an increase in the coating amount is not exhibited if the coating amount of the carbon-containing coating layer is 20 parts by mass or more.

In a negative electrode active material for non-aqueous electrolyte secondary battery according to the present disclosure, the carbon-containing coating layer may have an average thickness of 1 nm to 2 µm, preferably 5 nm to 1 µm, and more preferably 10 nm to 0.8 µm. In a negative electrode active material for non-aqueous electrolyte secondary battery according to the present disclosure, conductivity improvement cannot be obtained if the carbon-containing coating layer has an average thickness of less than 1 nm, and a conductivity improving effect due to addition of a carbon material cannot be obtained if the carbon-containing coating layer has an average thickness of more than 2 µm.

In a negative electrode active material for non-aqueous electrolyte secondary battery according to the present disclosure, the carbon-containing coating layer comprises at least one selected from the group consisting of amorphous carbon, carbon nanofiber, carbon nanotube, graphite, graphene, graphene oxide, and reduced graphene oxide.

In a negative electrode active material for non-aqueous electrolyte secondary battery according to the present disclosure, the silicon oxide composite having the carbon coated thereon may have an average particle diameter of 0.5 to 20 μm. The average particle diameter is a value measured an average weight $D_{50}$ in the measurement of particle size distribution by a laser diffraction method, i.e., a particle diameter or median diameter when cumulative weight becomes 50%. In a negative electrode active material for non-aqueous electrolyte secondary battery according to the present disclosure, charging or discharging capacity per unit volume is decreased as volume density is lowered if the average particle diameter of the silicon oxide composite having the carbon coated thereon is too small, while it is apprehended that the electrode membrane is exfoliated from a current collector as it is difficult to manufacture an electrode membrane if the average particle diameter of the silicon oxide composite having the carbon coated thereon is too large.

In a negative electrode active material for non-aqueous electrolyte secondary battery according to the present disclosure, it is preferable that the silicon oxide composite having the carbon coated thereon has a specific surface area of 1 to 40 $m^2/g$. Further, in a negative electrode active material for non-aqueous electrolyte secondary battery according to the present disclosure, it is more preferable that the silicon oxide composite having the carbon coated thereon has a specific surface area of 1 to 20 $m^2/g$. In a negative electrode active material for non-aqueous electrolyte secondary battery according to the present disclosure, it is not preferable that the silicon oxide composite has a specific surface area of less than 1 $m^2/g$ since charging and discharging characteristics are deteriorated, and it is not preferable that the silicon oxide composite has a specific surface area of more than 40 $m^2/g$ since a side reaction occurs as an area of the silicon oxide composite contacted with an electrolyte is increased such that a decomposition reaction of the electrolyte is promoted.

Furthermore, the present disclosure provides a negative electrode comprising a negative electrode active material comprising a silicon oxide composite according to the present disclosure.

A negative electrode according to the present disclosure comprises 30 to 95 wt % of at least one selected from the group consisting of graphite, conductive carbon black, soft carbon, hard carbon, carbon nanofiber, carbon nanotube, graphene, reduced graphene oxide, and graphene nanoflake with respect to the total weight of the negative electrode active material. Namely, a negative electrode according to the present disclosure can further comprise a negative electrode material which has been used as a conventional negative electrode besides the silicon oxide composite, specifically at least one selected from the group consisting of graphite, conductive carbon black, soft carbon, hard carbon, carbon nanofiber, carbon nanotube, graphene, reduced graphene oxide, and graphene nanoflake. It is preferable that a negative electrode according to the present disclosure comprises 30 to 95 wt % of material contained in the negative electrode besides the silicon oxide composite according to the present disclosure with respect to the total weight of the negative electrode active material.

Furthermore, the present disclosure provides a non-aqueous electrolyte secondary battery comprising a negative electrode active material for non-aqueous electrolyte secondary battery according to the present disclosure.

Furthermore, the present disclosure provides a method of manufacturing a negative electrode active material for non-aqueous electrolyte secondary battery according to the present disclosure, the method comprising:

a first step of injecting a mixture which is prepared by mixing silicon particles having an average particle size of 0.1 to 20 μm with silicon dioxide particles having an average particle size of 10 to 300 nm, and magnesium having an average particle size of 1 to 100 mm into a reactor;

a second step of adjusting pressure of the reactor to 0.000001 to 1 torr;

a third step of heating the mixture and magnesium to 600 to 1600° C. to prepare a silicon oxide composite;

a fourth step of cooling the silicon oxide composite, and depositing the cooled silicon oxide composite on a metal plate; and a fifth step of pulverizing and classifying the cooled silicon oxide composite deposited on the metal plate into a powder with an average particle diameter of 0.5 to 15 μm.

A method of manufacturing a negative electrode active material for non-aqueous electrolyte secondary battery according to the present disclosure can improve capacity retention rate of the silicon oxide composite resultingly by heating an Si/$SiO_2$ raw material powder mixture along with magnesium such that a silicon oxide composite is synthesized in an uniform gas phase reaction of the Si/$SiO_2$ raw material powder mixture and magnesium particles, thereby preventing that silicon is rapidly grown by an exothermic reaction having Mg locally excessively mixed therein as in a conventional solid phase reaction.

A negative electrode active material for non-aqueous electrolyte secondary battery according to the present disclosure is reacted in such a vapor phase. Therefore, since Si, $SiO_2$, and magnesium are each is in a combined state at atomic level, a volume change during intercalation or deintercalation of Li ions is small, and it is difficult to produce cracks in an electrode active material due to repetition of charging and discharging processes. Accordingly, cycle characteristics are excellent since, although there is a large number of cycles, capacity deterioration hardly occurs, and there is not rapid deterioration of capacity at a small number of cycles as in an existing negative active material. Since each phase is in a combined state at atomic level in a silicon oxide composite according to the present disclosure, the silicon oxide composite according to the present disclosure also has characteristics including easy deintercalation of Li ions during discharging process, well-balanced charging and discharging of the Li ions, and high charging and discharging efficiencies.

A method of manufacturing a negative electrode active material for non-aqueous electrolyte secondary battery according to the present disclosure further comprises a sixth step of supplying the silicon oxide composite of the fifth step and a carbon source, and reacting the silicon oxide composite with the carbon source at 600 to 1200° C., thereby forming a carbon-containing coating layer disposed on the surface of the silicon oxide composite.

In a method of manufacturing a negative electrode active material for non-aqueous electrolyte secondary battery according to the present disclosure, the silicon particle used as the raw material has an average particle size of 2 to 20 μm, and the silicon dioxide particle has an average particle size of 10 to 300 nm.

In a method of manufacturing a negative electrode active material for non-aqueous electrolyte secondary battery according to the present disclosure, the carbon source is at least one selected from the group consisting of methane, propane, butane, acetylene, benzene, and toluene.

In a method of manufacturing a negative electrode active material for non-aqueous electrolyte secondary battery according to the present disclosure, the silicon oxide composite and the carbon source are injected, and at least one selected from the group consisting of nitrogen, helium, argon, carbon dioxide, hydrogen, and water vapor are additionally injected.

BRIEF DESCRIPTION OF THE DRAWINGS

FIG. 1 to FIG. 4 show results of measuring X-ray diffraction (XRD) analysis values of carbon-coated silicon oxide composites prepared in Examples and Comparative Examples of the present disclosure.

DESCRIPTION OF EXEMPLARY EMBODIMENTS

Hereinafter, the present disclosure will be described in more detail by Examples. However, the present disclosure is not limited to the following Examples.

<Example 1> Preparation of a Magnesium-Containing Silicon Oxide Composite

After heat-treating 15 kg of a mixed powder obtained by uniformly mixing a silicon powder with a silicon dioxide ($SiO_2$) powder to a molar ratio of 1:1 and 1.5 kg of magnesium to 1,400° C. under a reduced-pressure atmosphere of 0.0001 to 1 torr, thereby simultaneously generating a silicon oxide vapor caused by the mixed powder of the silicon powder and the silicon dioxide ($SiO_2$) powder, and a magnesium vapor such that the silicon oxide vapor and the magnesium vapor are reacted in a vapor phase to obtain a reaction product, cooling and precipitating the reaction product at 700° C. to obtain a precipitated reaction product, and pulverizing and classifying the precipitated reaction product by a jet mill, a magnesium-containing silicon oxide composite powder having an average particle diameter ($D_{50}$) of 6.3 μm was recovered.

A silicon oxide composite comprising 6.2 wt % of magnesium, the silicon oxide composite having a carbon coating layer containing 5 wt % of carbon formed thereon (sample 1) was prepared by performing a chemical vapor deposition (CVD) treatment process on the recovered magnesium-containing silicon oxide composite powder under a mixed gas of argon (Ar) and methane ($CH_4$) at conditions of 1,000° C. and 2 hours by using a tube-type electric furnace in order to form a carbon-containing coating layer.

It was confirmed that the magnesium-containing silicon oxide composite (sample 1) had a BET specific surface area of 6.2 m$^2$/g, a specific gravity of 2.3 g/cm$^3$, an average particle diameter ($D_{50}$) of 6.3 μm, and a size of silicon crystal measured by X-ray diffraction analysis (CuKα) of 8 nm.

<Example 2> Preparation of a Magnesium-Containing Silicon Oxide Composite

A silicon oxide composite comprising 9 wt % of magnesium (sample 2) was prepared, and the silicon oxide composite powder having a carbon coating layer containing 5 wt % of carbon formed thereon was prepared by the same method as in Example 1 except that the reaction product was cooled and precipitated at 800° C. to obtain a precipitated reaction product.

It was confirmed that the magnesium-containing silicon oxide composite (sample 2) had a BET specific surface area of 6.3 m$^2$/g, a specific gravity of 2.3 g/cm$^3$, an average particle diameter ($D_{50}$) of 6.2 μm, and a size of silicon crystal measured by X-ray diffraction analysis (CuKα) of 8 nm.

<Example 3> Preparation of a Magnesium-Containing Silicon Oxide Composite

A silicon oxide composite comprising 11.7 wt % of magnesium (sample 3) was prepared, and the silicon oxide composite powder having a carbon coating layer containing 10 wt % of carbon formed thereon was prepared by the same method as in Example 1 except that the reaction product was cooled and precipitated at 900° C. to obtain a precipitated reaction product.

It was confirmed that the magnesium-containing silicon oxide composite (sample 3) had a BET specific surface area of 5.8 m$^2$/g, a specific gravity of 2.4 g/cm$^3$, an average particle diameter ($D_{50}$) of 6.7 μm, and a size of silicon crystal measured by X-ray diffraction analysis (CuKα) of 11 nm.

<Example 4> Preparation of a Magnesium-Containing Silicon Oxide Composite

A silicon oxide composite comprising 4.6 wt % of magnesium (sample 4) was prepared, and the silicon oxide composite powder having a carbon coating layer containing 7 wt % of carbon formed thereon was prepared by the same method as in Example 1 except that the reaction product was cooled and precipitated at 1000° C. to obtain a precipitated reaction product.

It was confirmed that the magnesium-containing silicon oxide composite (sample 4) had a BET specific surface area of 7.3 m$^2$/g, a specific gravity of 2.3 g/cm$^3$, an average particle diameter ($D_{50}$) of 6.2 μm, and a size of silicon crystal measured by X-ray diffraction analysis (CuKα) of 7 nm.

<Example 5> Preparation of a Magnesium-Containing Silicon Oxide Composite

A silicon oxide composite comprising 16.6 wt % of magnesium (sample 5) was prepared, and the silicon oxide composite powder having a carbon coating layer containing 4 wt % of carbon formed thereon was prepared by the same method as in Example 1 except that the reaction product was cooled and precipitated at 1100° C. to obtain a precipitated reaction product.

It was confirmed that the magnesium-containing silicon oxide composite (sample 5) had a BET specific surface area of 6.8 m$^2$/g, a specific gravity of 2.4 g/cm$^3$, an average particle diameter ($D_{50}$) of 7.1 μm, and a size of silicon crystal measured by X-ray diffraction analysis (CuKα) of 14 nm.

<Example 6> Preparation of a Magnesium-Containing Silicon Oxide Composite

A silicon oxide composite comprising 3 wt % of magnesium (sample 6) was prepared, and the silicon oxide composite powder having a carbon coating layer containing 5 wt % of carbon formed thereon was prepared by the same method as in Example 1 except that the reaction product was cooled and precipitated at 800° C. to obtain a precipitated reaction product.

It was confirmed that the magnesium-containing silicon oxide composite (sample 6) had a BET specific surface area of 6.3 m²/g, a specific gravity of 2.3 g/cm³, an average particle diameter ($D_{50}$) of 5.9 μm, and a size of silicon crystal measured by X-ray diffraction analysis (CuKα) of 6 nm.

<Comparative Example 1> Preparation of a Magnesium-Noncontaining Silicon Oxide Composite A silicon oxide composite having a carbon coating layer containing 5 wt % of carbon formed thereon (sample 7) was prepared by the same method as in Example 1 except that the mixed powder was heat-treated without adding magnesium to the mixed powder.

It was confirmed that the silicon oxide composite (sample 7) had a BET specific surface area of 6.5 m²/g, a specific gravity of 2.0 g/cm³, an average particle diameter ($D_{50}$) of 6.0 μm, and a size of silicon crystal measured by X-ray diffraction analysis (CuKα) of 5 nm.

<Comparative Example 2> Preparation of a Magnesium-Containing Silicon Oxide Composite A silicon oxide composite comprising 1 wt % of magnesium, the silicon oxide composite having a carbon coating layer containing 5 wt % of carbon formed thereon (sample 8) was prepared by the same method as in Example 1 except that the reaction product was naturally cooled and precipitated to obtain a precipitated reaction product.

It was confirmed that the magnesium-containing silicon oxide composite (sample 8) had a BET specific surface area of 5 m²/g, a specific gravity of 2.2 g/cm³, an average particle diameter ($D_{50}$) of 6.5 μm, and a size of silicon crystal measured by X-ray diffraction analysis (CuKα) of 8 nm.

Experimental Example 1

After analyzing average particle diameters, specific surface areas and magnesium contents of the silicon oxide composites (samples 1 to 8) prepared in Examples 1 to 6 and Comparative Examples 1 and 2, analysis results are shown in the following Table 1.

<Experimental Example> XRD Analysis

Figure 1:
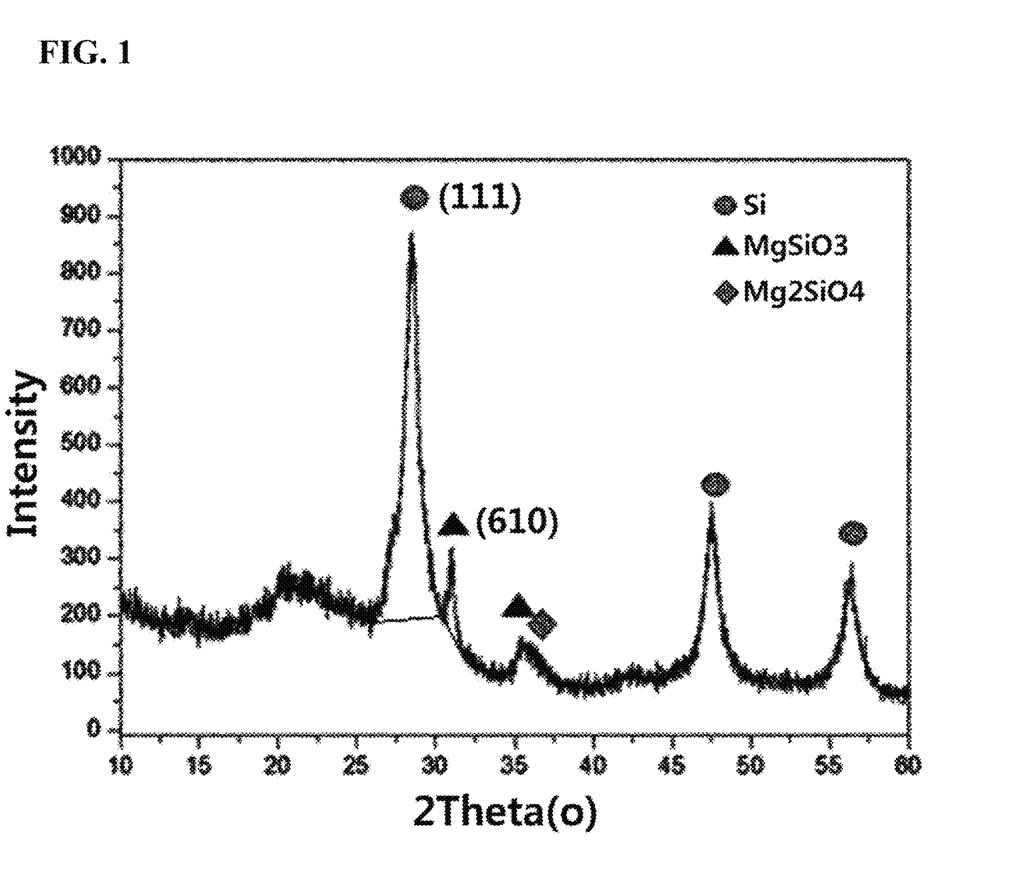
Figure 2:
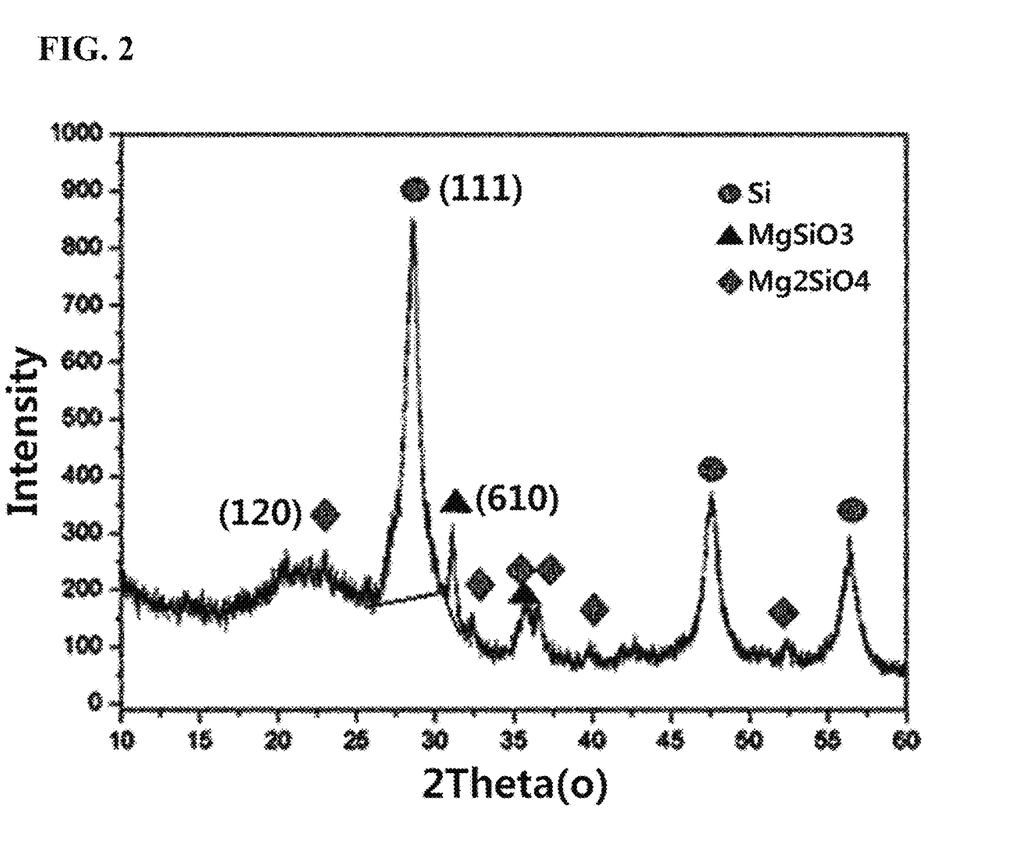
Figure 3:
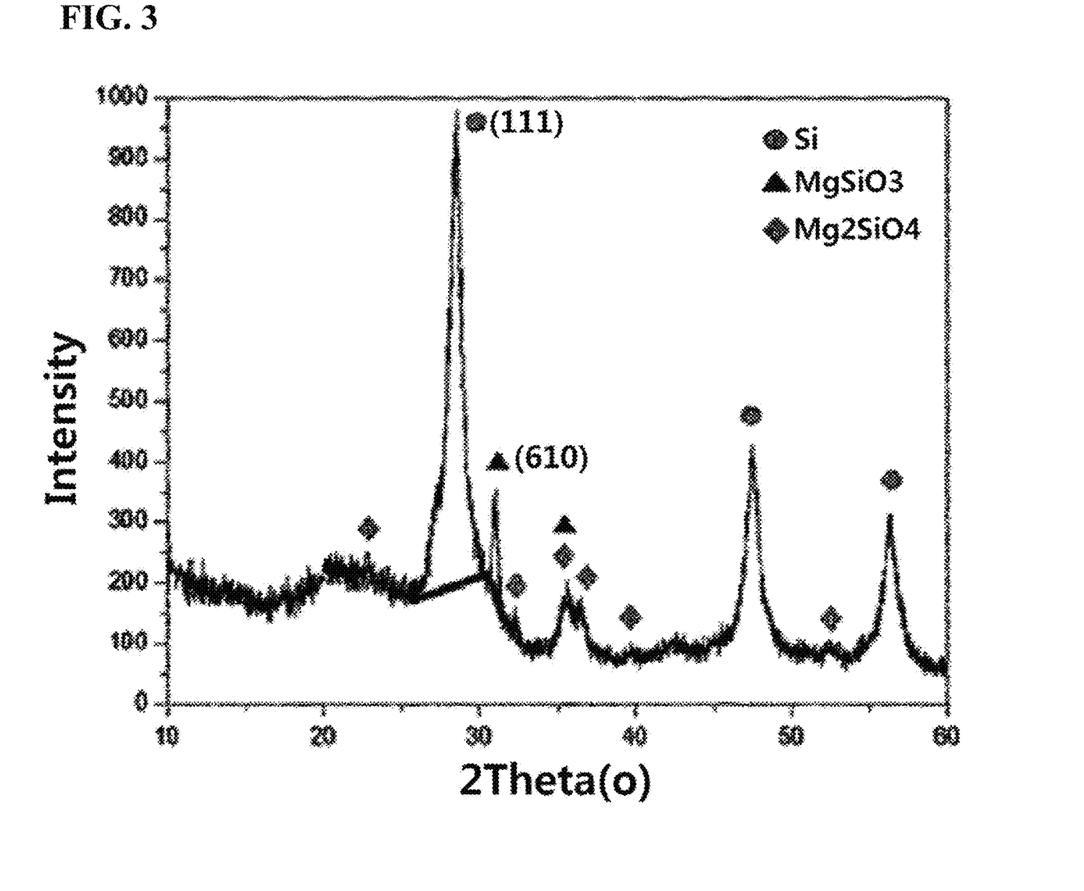

After measuring XRD values of the magnesium-containing silicon oxide composites (samples 1 to 8) prepared in Examples 1, 2 and 6, measurement results are shown in the following Table 2 and FIG. 1 to FIG. 3.

The XRD values were measured by an X-ray diffraction equipment (equipment name: X'Pert3) manufactured by Malvern Panalytical, and the measurement process was performed from 10° to 60° at 45 kV and 40 mV for 30 minutes.

A height from a center value to a maximum peak point was determined as Intensity Si(111) by connecting an Si(111) peak starting point and an Si(111) peak ending point with a line through X-ray diffraction analysis (CuKα), and Intensity $MgSiO_3$(610) was set in an $MgSiO_3$(610) peak also by the same method as in the Si(111) peak. Further, size of an Si crystal was calculated by the following Scherrer's equation.

$$D=0.9*\lambda/(\beta*\cos\theta)$$ <Scherrer's equation>

D: Particle diameter size

β: FWHM (full width at half maximum)

λ: Wave length of X-ray (0.1541 nm)

When examining a ratio $I_{MgSiO3(610)}/I_{Si(111)}$ of a diffraction peak intensity $I_{MgSiO3(610)}$ by $MgSiO_3$ detected at 2θ=30° to 32° to a diffraction peak intensity $I_{Si(111)}$ detected at 2θ=27.5° to 29.5° during X-ray diffraction analysis, it can be confirmed from the following Table 2 that the silicon oxide composites in Examples 1 to 6 according to the present disclosure have more than 0.1 of the ratio $I_{MgSiO3(610)}/I_{Si(111)}$ while the $MgSiO_3$(610) peak is not detected in the silicon oxide composites in Comparative Examples according to the present disclosure, or the silicon oxide composites in Comparative Examples according to the present disclosure has less than 0.1 of the ratio $I_{MgSiO3(610)}/I_{Si(111)}$.

TABLE 1

Comparison of the silicon oxide composites prepared by Examples 1 to 6, and Comparative Examples 1 and 2

| | Example 1 | Example 2 | Example 3 | Example 4 | Example 5 | Example 6 | Comparative Example 1 | Comparative Example 2 |
|---|---|---|---|---|---|---|---|---|
| $D_{50}$ (μm) | 6.3 | 6.2 | 6.7 | 6.2 | 7.1 | 5.9 | 6.0 | 6.5 |
| BET (m²/g) | 6.2 | 6.3 | 5.8 | 7.3 | 6.8 | 6.3 | 6.5 | 5.0 |
| Mg content (wt %) | 6.2 | 9.0 | 11.7 | 4.6 | 16.6 | 3.0 | 0 | 1 |
| Si C, S (nm) | 8 | 8 | 11 | 7 | 14 | 6 | 5 | 8 |

TABLE 2

|  | Example 1 | Example 2 | Example 3 | Example 4 | Example 5 | Example 6 | Comparative Example 1 | Comparative Example 2 |
|---|---|---|---|---|---|---|---|---|
| Si(111)2θ(°) | 28.5056 | 28.5056 | 28.5476 | 28.4796 | 28.5836 | 28.5606 | 28.5216 | 28.4762 |
| Si(111)FWHM(°) | 1.02 | 1.03 | 0.75 | 1.16 | 0.59 | 137 | 1.65 | 1.03 |
| FWHM (radians) | 0.0178 | 0.0180 | 0.0131 | 0.0202 | 0.0103 | 0.0239 | 0.0287 | 0.0179 |
| Intensity MgSiO$_3$(610) | 147.22 | 154.11 | 181.97 | 150.03 | 140.87 | 147.51 | — | 21.5 |
| Intensity Si(111) | 715.94 | 712.22 | 828.42 | 755.37 | 840.81 | 618.33 | 317.85 | 551.50 |
| MgSiO$_3$(610)/Si(111) | 0.21 | 0.22 | 0.22 | 0.20 | 0.17 | 0.24 | — | 0.04 |

<Manufacturing Example> Manufacturing of Batteries

Negative electrodes for lithium secondary batteries comprising the above-mentioned silicon oxide composite powders prepared according to Examples and Comparative Examples as electrode active materials, and batteries (coil cells) were manufactured.

Negative electrode slurry compositions were prepared by mixing water with mixtures having the active materials, SUPER-P as a conductive material, and polyacrylic acid mixed therein at a weight ratio of 80:10:10.

Electrodes with a thickness of 70 μm were manufactured by applying the compositions to a copper foil with a thickness of 18 μm and drying the compositions applied to the copper foil, coil cell negative electrodes were manufactured by punching the electrode-applied copper foils into a circular shape with a diameter of 14 mm, and a metal lithium foil with a thickness of 0.3 mm was used as an opposite electrode.

A porous polyethylene sheet with a thickness of 0.1 mm was used as a separator, an electrolyte prepared by dissolving LiPF$_6$ with a concentration of 1M in a solution having ethylene carbonate (EC) and diethyl carbonate (DEC) mixed therein at a volume ratio of 1:1 was used as an electrolytic solution, and coin cells (batteries) having a thickness of 2 mm and a diameter of 32 mm were manufactured by applying the above-mentioned elements.

Experimental Example

After obtaining charge capacities (mAh/g), discharge capacities (mAh/g), and initial charging/discharging efficiency (%) by charging the coin cells manufactured in Manufacturing Example until it was a voltage of 0.005 V at a constant current of 0.1 C, and discharging the coin cells manufactured in Manufacturing Example until it was a voltage of 2.0 V at the constant current of 0.1 C, obtained results are shown in the following Table 3.

Further, after obtaining cycle characteristics (50 cycle capacity retention rates) by performing one cycle of a charging and discharging process on the coin cells manufactured for each of the samples in Manufacturing Example, and charging the coin cells until it was a voltage of 0.005 V at the constant current of 0.5 C and discharging the coin cells until it was a voltage of 2.0 V at the constant current of 0.5 C from a second cycle of the charging and discharging process, obtained results are shown in the following Table 3.

It can be confirmed that the silicon oxide composites according to Examples of the present disclosure have greatly improved initial efficiencies and 50 cycle capacity retention rates (%) when a ratio $I_{MgSiO3(610)}/I_{Si(111)}$ of a diffraction peak intensity $I_{MgSiO3(610)}$ by MgSiO$_3$ detected at 2θ=30° to 32° to a diffraction peak intensity $I_{Si(111)}$ by Si(111) detected at 2θ=27.5° to 29.5° is in a range of $0.1 < I_{MgSiO3(610)}/I_{Si(111)} < 0.5$.

TABLE 3

Evaluation results of battery characteristics

|  | Example 1 | Example 2 | Example 3 | Example 4 | Example 5 | Example 6 | Comparative Example 1 | Comparative Example 2 |
|---|---|---|---|---|---|---|---|---|
| Initial discharge capacity (mAh/g) | 1410 | 1346 | 1343 | 1433 | 1307 | 1478 | 1577 | 1465 |
| Initial efficiency (%) | 81.4 | 80.7 | 82.4 | 80.4 | 85.8 | 77.6 | 74 | 76 |
| 50 cycle capacity retention rate (%) | 85 | 87 | 84 | 83 | 80 | 84 | 81 | 80 |

A negative electrode active material for non-aqueous electrolyte secondary battery according to the present disclosure can improve lifetime characteristics, charging and discharging capacities, initial charging and discharging efficiencies, and capacity retention rate by reacting silicon, silicon dioxide and magnesium through a gas phase reaction and coating carbon on the surface of the silicon oxide composite so as to give conductivity to a silicon oxide composite, thereby exhibiting a structure which is stable to a volume change according to intercalation or deintercalation of lithium as well as conductivity of a non-aqueous electrolyte secondary battery comprising a negative electrode active material for non-aqueous electrolyte secondary battery according to the present disclosure. Therefore, a non-aqueous electrolyte secondary battery which is stable and has high performance by comprising a negative electrode active material according to the present disclosure can be provided.

What is claimed is:

1. A negative electrode active material for non-aqueous electrolyte secondary battery, the negative electrode active material comprising:
   a silicon oxide composite comprising silicon, a silicon oxide (SiO$_x$, 0<x≤2), and a magnesium silicate,
   wherein the magnesium silicate includes MgSiO$_3$, and the negative electrode active material has a ratio of a diffraction peak intensity of MgSiO$_3$, denoted as IMgSiO3$_{(610)}$ and detected at 2θ=30° to 32° to a diffraction peak intensity of Si(111), denoted as I$_{si(111)}$ and detected at 2θ=27.5° to 29.5°, in X-ray diffraction analysis, such that 0.1<I$_{MgSiO3(610)}$/I$_{si(111)}$<0.3, wherein the silicon of the silicon oxide composite is dispersed in a matrix comprising silicon oxide and the magnesium silicate, wherein the silicon oxide composite further comprises a carbon-containing coating layer on a surface thereof, wherein the silicon oxide composite comprises 2 to 20 parts by weight of the carbon-containing coating layer per 100 parts by weight of the total silicon oxide composite, and wherein the average thickness of the carbon-containing coating layer is from 1 nm to 2 μm.

2. The negative electrode active material for non-aqueous electrolyte secondary battery of claim 1, wherein the silicon oxide composite comprises 2 to 30 wt % of magnesium based on a total weight of the silicon oxide composite.

3. The negative electrode active material for non-aqueous electrolyte secondary battery of claim 1, wherein the silicon oxide composite allows a diffraction peak by Si(111) to be shown at 2θ=27.5° to 29.5° in X-ray diffraction analysis, and has a silicon crystallite size of 2 to 100 nm calculated from Full Width at Half Maximum (FWHM) of the diffraction peak.

4. The negative electrode active material for non-aqueous electrolyte secondary battery of claim 1, wherein the magnesium silicate further comprises Mg$_2$SiO$_4$.

5. The negative electrode active material for non-aqueous electrolyte secondary battery of claim 1, wherein the silicon oxide composite has a ratio (Si/O) of the number of silicon atoms to that of oxygen atoms of 0.5 to 2.

6. The negative electrode active material for non-aqueous electrolyte secondary battery of claim 1, wherein the carbon-containing coating layer comprises at least one selected from the group consisting of amorphous carbon, carbon nanofiber, carbon nanotube, graphite, graphene, graphene oxide, and reduced graphene oxide.

7. A negative electrode comprising a negative electrode active material for non-aqueous electrolyte secondary battery according to claim 1.

8. The negative electrode of claim 7, wherein the negative electrode comprises 30 to 95 wt % of at least one selected from the group consisting of graphite, conductive carbon black, soft carbon, hard carbon, carbon nanofiber, carbon nanotube, graphene, reduced graphene oxide, and graphene nanoflake with respect to the total weight of the negative electrode.

9. A non-aqueous electrolyte secondary battery comprising the negative electrode according to claim 8.

10. A method of manufacturing a negative electrode active material for non-aqueous electrolyte secondary battery according to claim 1, the method comprising:
a first step of injecting a mixture of silicon particles and silicon dioxide particles, and magnesium into a reactor;
a second step of adjusting pressure of the reactor to 0.000001 to 1 torr;
a third step of heating the mixture and magnesium to 600 to 1600° C. to prepare a silicon oxide composite;
a fourth step of cooling the silicon oxide composite, and depositing the cooled silicon oxide composite on a metal plate; and
a fifth step of pulverizing and classifying the cooled silicon oxide composite deposited on the metal plate into a powder with an average particle diameter of 0.5 to 15 μm.

11. The method of claim 10, wherein the silicon particle has an average particle size of 2 to 20 μm, and the silicon dioxide particle has an average particle size of 10 to 300 nm.

12. The method of claim 10, further comprising a sixth step of injecting the silicon oxide composite of the fifth step and a carbon source, and heat-treating the silicon oxide composite and the carbon source at 600 to 1200° C., thereby forming a carbon-containing coating layer on a surface of the silicon oxide composite.

13. The method of claim 12, wherein the carbon source is at least one selected from the group consisting of methane, propane, butane, acetylene, benzene, and toluene.

14. The method of claim 12, wherein the sixth step comprises additionally injecting at least one selected from the group consisting of nitrogen, helium, argon, carbon dioxide, hydrogen, and water vapor besides the carbon source.

15. The negative electrode active material for non-aqueous electrolyte secondary battery of claim 1, wherein the ratio of a diffraction peak intensity I$_{MgSiO3(610)}$ to a diffraction peak intensity I$_{si(111)}$ is 0.17≤I$_{MgSiO3(610)}$/I$_{si(111)}$≤0.24.

* * * * *